United States Patent
Oelke

(10) Patent No.: US 9,449,242 B2
(45) Date of Patent: Sep. 20, 2016

(54) LAPTOP DETECTION

(71) Applicant: Smiths Heimann GmbH, Wiesbaden (DE)

(72) Inventor: Dominik Oelke, Wiesbaden (DE)

(73) Assignee: Smiths Heimann GmbH, Wiesbaden (DE)

(*) Notice: Subject to any disclaimer, the term of this patent is extended or adjusted under 35 U.S.C. 154(b) by 344 days.

(21) Appl. No.: 13/682,865

(22) Filed: Nov. 21, 2012

(65) Prior Publication Data

US 2013/0163811 A1    Jun. 27, 2013

Related U.S. Application Data

(60) Provisional application No. 61/562,488, filed on Nov. 22, 2011.

(51) Int. Cl.
*G06K 9/46* (2006.01)
*G06T 7/00* (2006.01)

(52) U.S. Cl.
CPC .............. *G06K 9/46* (2013.01); *G06T 7/0008* (2013.01); *G06T 2207/10116* (2013.01); *G06T 2207/30112* (2013.01)

(58) Field of Classification Search
CPC ............... G06T 2207/30112; G06K 2209/09
See application file for complete search history.

(56) References Cited

U.S. PATENT DOCUMENTS

| | | | | |
|---|---|---|---|---|
| 2008/0123895 | A1* | 5/2008 | Gable et al. | 382/100 |
| 2009/0175411 | A1* | 7/2009 | Gudmundson et al. | 378/57 |
| 2010/0239182 | A1* | 9/2010 | Basu | G01V 5/0008 382/282 |
| 2011/0206240 | A1* | 8/2011 | Hong | G06K 9/00771 382/103 |

FOREIGN PATENT DOCUMENTS

WO    2010/145016    12/2010

OTHER PUBLICATIONS

Yildiz, Y.O.; Abraham, D.Q.; Panetta, K.; Agaian, S., "A New Concept of Airport Security Screening," Technologies for Homeland Security, 2008 IEEE Conference on , vol., No., pp. 444,448, May 12-13, 2008.*
Adams, Rolf, and Leanne Bischof. "Seeded region growing." Pattern Analysis and Machine Intelligence, IEEE Transactions on 16.6 (1994): 641-647.*
International Search Report and Written Opinion for Int'l Application No. PCT/IB2012/003088, mailed Jul. 11, 2013.

* cited by examiner

*Primary Examiner* — Chan Park
*Assistant Examiner* — Geoffrey E Summers
(74) *Attorney, Agent, or Firm* — Casimir Jones SC; David Staple

(57) ABSTRACT

Provided herein are devices, systems, and methods for the detection of objects (e.g., laptop computers, electronics, explosives, etc.) within luggage. In particular, methods are provided for the detection of laptop computers within luggage (e.g., luggage containing other metallic objects and/or electronic devices).

13 Claims, 12 Drawing Sheets

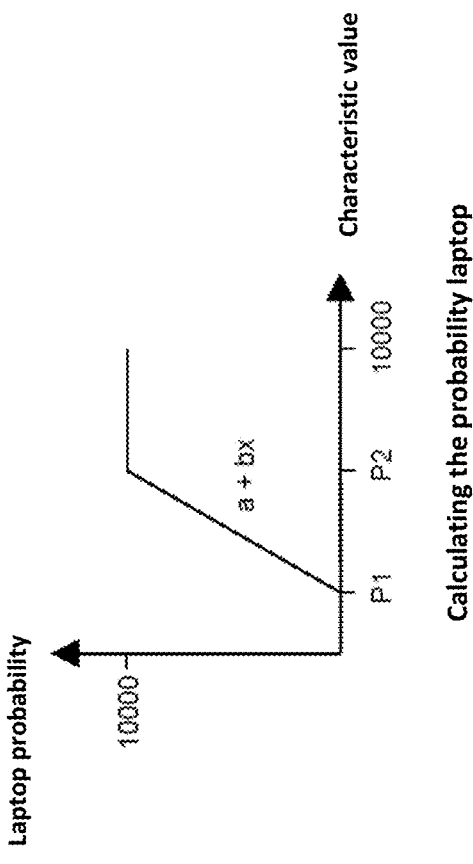

LAPTOP DETECTION

CROSS-REFERENCE TO RELATED APPLICATIONS

The present invention claims the benefit of U.S. Provisional Patent Application 61/562,488, filed Nov. 22, 2011, which is incorporated by reference in its entirety.

FIELD

Provided herein are devices, systems, and methods for the detection of objects (e.g., laptop computers, electronics, explosives, etc.) within luggage. In particular, methods are provided for the detection of laptop computers within luggage (e.g., luggage containing other metallic objects and/or electronic devices).

BACKGROUND

Laptop computers are commonly carried by travelers, and stored in luggage, particularly carry-on luggage. Due to their density and complexity of materials, laptops create difficulty in accurately screening luggage for other objects of concern. In order to properly screen luggage for contraband and/or threats to security, it is typically required that laptops be separated from luggage prior to screening. However, a suitable automated method of identifying the presence or absence of a laptop computer in a piece of luggage and/or determining compliance of an individual with the requirement to remove laptops from luggage does not exist.

SUMMARY

In some embodiments, the present invention provides a method of detecting the presence of an object of interest in a container comprising: determining a final size and a final probability score of a final search region; and determining whether the object of interest exist within the container based on the final size of the final search region, the final probability score of the final search region, or both. In some embodiments, determining whether the object of interest exist within the container is based on the final size of the final search region. In some embodiments, determining whether the object of interest exist within the container is based on the final probability score of the final search region. In some embodiments, determining whether the object of interest exist within the container is based on both the final size and the final probability score of the final search region. In some embodiments, determining a size and a final probability score of a final search region comprises one or more of the steps of: (a) determining a search region; (b) calculating a search region probability score; (c) expanding the search region to a final search region; (d) calculating a probability score for the final search region; and (e) determining the size of the final search region. In some embodiments, one or more of steps (a)-(e) are performed in order. In some embodiments, one or more of steps (a)-(e) are performed in a different order. In some embodiments, determining a search region comprises one or more of the steps of: (i) obtaining an image of the container; (ii) identifying a region of the image with one or more features that are characteristic of the object of interest; (iii) applying a minimum bounding region to the image, wherein the minimum bounding region encompasses the region of the image with one or more features that are characteristic of the object of interest; (iv) selecting a search region within the minimum bounding region. In some embodiments, a region probability score provides a likelihood that a portion of the object of interest resides within the search region, and wherein the search region probability score is based upon properties of the object of interest. In some embodiments, expanding the search region to a final search region comprises the steps of: (i) expanding the search region in one direction; (ii) calculating a probability score for the expanded portion of the search region; (iii) accepting or rejecting the expanded portion into the search region based on the probability score of the expanded portion; (iv) repeating steps (i) through (iii) until expansion in each direction consecutively: (A) meets an edge of the minimum bound region; (B) does not result in a probability score for the expanded portion over an acceptance threshold; (C) a combination of (A) and (B); (v) establishing a final search region with a final size and final probability score. In some embodiments, an image is obtained by dual-energy x-ray imaging. In some embodiments, an object of interest comprises a laptop computer. In some embodiments, a container comprises luggage, a bag, jacket, box, etc.

In some embodiments, provided herein is a method of detecting the presence of an object of interest in a container comprising one or more steps of: (a) obtaining an image of the container; (b) identifying a region of the image with one or more features that are characteristic of the object of interest; (c) applying a minimum bounding region to the image, wherein the minimum bounding region encompasses the region; (d) selecting a search region within the minimum bounding region; (e) calculating a probability score for the search region, wherein probability score relates to the likelihood that a portion of the object of interest resides within the search region, and wherein the probability score is based upon properties of the object of interest; (f) expanding the search region in one dimension; (g) calculating an updated probability score for the expanded portion of the search region; (h) accepting or rejecting the expanded portion into the search region based on the probability score of the expanded portion; (i) repeating steps (f) through (h) until: expansion in each direction (1) meets or exceeds an edge of the minimum bound region is reached, and/or (2) does not result in an expanded portion with a probability score above a threshold value, thereby resulting in a search region of final size and final probability score; and (k) determining whether the object of interest exist within the container based on the final size and/or final probability score of the search region. In some embodiments, one or more of steps (a)-(k) are performed in the above listed order. In some embodiments, one or more of steps (a)-(k) are performed in an order other that the above listed order. In some embodiments, determining whether the object of interest exist within the container is based on the final size of the final search region. In some embodiments, determining whether the object of interest exist within the container is based on the final probability score of the final search region. In some embodiments, determining whether the object of interest exist within the container is based on both the final size and the final probability score of the final search region.

In some embodiments, steps (f) through (h) are repeated until expansion in each direction consecutively results in either or both of: (1) meeting or exceeding an edge of the minimum bound region, and/or (2) an expanded portion and/or expanded search area yielding with a probability score below a threshold value. In some embodiments, steps (f) through (h) are repeated if expansion in 3 or fewer consecutive directions results in either of: (1) the edges of the minimum bounding region being exceeded or (2) an expanded portion and/or expanded search area yielding with a probability score below a threshold value.

In some embodiments, the object of interest is of any suitable shape or size for fitting in a given container. In some embodiments, the object of interest is a rectangle or comprises a rectangular portion. In some embodiments, the object of interest comprises electronics (e.g., computer, laptop computer, mobile device, digital music player, etc.). In some embodiments, the object of interest comprises or is associated with explosives. In some embodiments, the object of interest comprises or is associated with contraband (e.g., drugs, currency, valuables, etc.). In some embodiments, the object of interest comprises a laptop. In some embodiments, the container comprises a piece of luggage (e.g., duffel bag, roller bag, hard-side luggage, soft-side luggage, etc.), purse, backpack, clothing, jacket, etc.). In some embodiments, the container comprises a shipping container, crate, box, cooler, styrofoam box, etc. In some embodiments, an image is obtained by x-ray (e.g., dual-energy x-ray), thermal imaging, magnetic resonance imaging, or any other suitable technique. In some embodiments, an image is obtained by dual-energy x-ray. In some embodiments, images (e.g., x-ray) are obtained from orthogonal orientations. In some embodiments, orthogonal images provide a vertical-search and horizontal-search view of a container (e.g., luggage) and/or object of interest (e.g., laptop).

In some embodiments, a method comprises identifying one or more features that are characteristic of an object of interest (e.g., laptop). In some embodiments, characteristic features include, but are not limited to one or more of: materials (e.g., metal %, non-metal %, metal contribution, non-metal contribution, material characteristics, metal content, non-metal content, presence of specific materials (e.g., tin, silicon, iron, aluminum, plastics, copper, gold, dioxins, polychlorinated biphenyls (PCBs), cadmium, chromium, radioactive isotopes, mercury, lead, etc.), similarity to specific materials, density, number of homogeneous segments, size of homogeneous segments, shape of homogeneous segments, shape/materials of components present, etc. In some embodiments, the presence and/or absence of one or more characteristic features (e.g., greater than X % metal, more than X number of segments, etc.) are combined to provide a combined-features probability score. In some embodiments, a combined-features probability score represents the likelihood that, based on the analyzed features (e.g., those included in the combined-features probability score), an object of interest (e.g., laptop) is present at a position within the image. In some embodiments, a combined-features probability score is calculated for each position within the image (e.g., a combined-features probability score for each pixel in the image). In some embodiments, a threshold is applied to the combined-features probability scores across the image (e.g., pixels are categorized as above or below a threshold). In some embodiments, pixels or positions across the image are binned according to their combined-features probability score (e.g., 2 bins, 3 bins, 4 bins, 5 bins, 6 bins, or more). In some embodiments, pixels or portions of the image are binarized according to their combined-features probability score. In some embodiments, pixels or portions of the image are binarized, binned, or subjected to a threshold according to any suitable criteria derived from the image or elsewhere.

In some embodiments, regions of contiguous pixels above a threshold are identified (e.g., as regions of interest). In some embodiments, regions of contiguous pixels in a top bin (e.g., 1, 2, 3, 4, or more bins with the highest combined-features probability score) are identified (e.g., as regions of interest). In some embodiments, a region of interest comprises a number of contiguous pixels (e.g., 10 . . . 20 . . . 50 . . . 100 . . . 200 . . . 500 . . . 1000, or more) above a threshold (or in one of more of the high-scoring bins). In some embodiments, a shape (e.g., polygon, circle, non-descript shape, etc.) is applied to an image to encompass one or more regions of interest. In some embodiments, a shape is applied to an image to encompass the region of interest. In some embodiments, every region of interest is bounded by a single shape. In some embodiments, each region of interest is bounded by its own shape. In some embodiments, a polygon is applied to an image to encompass one or more regions of interest. In some embodiments, a polygon is applied to an image to encompass the region of interest. In some embodiments, every region of interest is bounded by a single polygon. In some embodiments, each region of interest is bounded by its own polygon. In some embodiments, each region of interest is individually bounded by a multi-sided shape which encompasses all the pixels above the threshold, as well as pixels below the threshold, within that region. In some embodiments, a multi-sided shape is applied to the image to encompass regions of interest. In some embodiments, a minimum bounding region is applied to the image. In some embodiments, a minimum bounding region is of any suitable shape (e.g., rectangle, circle, polygon, non-descript shape, etc.). In some embodiments, a minimum bounding region is a rectangle. In some embodiments, a minimum bounding rectangle (MBR) is applied to the image. In some embodiments, an MBR is paraxial to the coordinate axis and/or to the edges of the image. In some embodiments, an MBR is not limited to being paraxial to the coordinate axis and/or to the edges of the image. In some embodiments, an MBR is not paraxial to the coordinate axis and/or to the edges of the image. In some embodiments, an MBR encompasses a single region of interest. In some embodiments, a single MBR encompasses every region of interest. In some embodiments, an MBR encompasses the entirety of a polygon applied to the image. In some embodiments, an MBR is the rectangular shape with the minimum area and/or minimum length sides that encompasses an entire polygon applied to the image. In some embodiments, an MBR is the rectangular shape with the minimum area and/or minimum length sides that encompasses a region of interest. In some embodiments, an MBR is the rectangular shape with the minimum area and/or minimum length sides that encompasses every region of interest within the image. In some embodiments, an MBR comprises the maximum search boarders for searches and/or search algorithms applied following placement of the rectangle.

In some embodiments, the properties within the MBR are analyzed. In some embodiments, properties are analyzed within one or more portions of the MBR. In some embodiments, properties relating to the object of interest are analyzed. In some embodiments, properties analyzed within the MBR include, but are not limited to one or more of: size of minimum bounding rectangle, mean gray value of metal image, standard deviation of gray value of metal image, fraction of pixels with very high metal content, fraction of pixels with very low metal content, fraction of pixels with very low non-metal content, aspect ratio of the rectangle, etc. In some embodiments, any suitable properties derived from the image are analyzed. In some embodiments, a probability score is calculated over the entire MBR. In some embodiments, a probability score is the composite of two or more (e.g., 2, 3, 4, 5, 6, 7, 8, 9, 10, or more) of the properties analyzed over the MBR. In some embodiments, a probability score is the composite of all of the properties analyzed over the MBR. In some embodiments, a probability score provides the likelihood that an object of interest (e.g., one or more objects of interest) is encompassed within the analyzed region. In some embodiments, an MBR probability score provides the likelihood that an object of interest is encompassed within the MBR. In some embodiments a probability score is directly proportional to the likelihood that an object of interest is encompassed within the analyzed region. In some embodiments, a minimum bounding region is discarded if a minimum threshold for an MBR probability score is not met. In some embodiments, further analysis is not performed on a minimum bounding region if a minimum threshold for an MBR probability score is not met. In some embodiments, further search is performed regardless of the probability score over the entire MBR.

In some embodiments, one or more subregions (e.g., 1, 2, 3, 4, 5, 6, 7, 8, 9, 10 . . . 20 . . . 50 . . . 100) are created within an MBR. In some embodiments, subregions are rectangles or squares. In some embodiments, each subregion is of equal size and the same shape. In some embodiments, subregions are evenly distributed about the MBR (e.g., 2×2, 2-1-2, 2×3, 2-3-2, 3-2-3, 3×3, etc.). In some embodiments, subregions have dimensions between 5 mm and 50 cm (e.g., 5 mm . . . 1 cm . . . 2 cm . . . 5 cm . . . 10 cm . . . 20 cm . . . 50 cm), although larger or smaller sizes may be used. In some embodiments, subregions are randomly distributed about the MBR. In some embodiments, subregions are manually placed about the MBR by an operator. In some embodiments, subregions are placed about the MBR according to analyzed properties of the MBR. In some embodiments, properties relating to the object of interest are calculated for each subregion. In some embodiments, probability scores are calculated for each subregion. In some embodiments, the subregion with the highest probability score is selected as an initial search region. In some embodiments, subregions with probability scores above a threshold are selected as initial search regions. In some embodiments, a search region with properties most indicative of the presence of an object of interest within the subregion is selected as an initial search region.

In some embodiments, an initial search region is expanded in one dimension (e.g., 0° direction), thereby creating a larger search area and an expanded portion. In some embodiments, a search region is expanded by 1%-50% (e.g., 1% . . . 2% . . . 5% . . . 10% . . . 20% . . . 50%) of a dimension of the initial search region. In some embodiments, a search region is expanded by a distance suitable for the image size, MBR size, search region size, etc. (e.g., 1 mm . . . 2 mm . . . 5 mm . . . 1 cm . . . 2 cm . . . 5 cm . . . 10 cm . . . 20 cm, or any suitable distance). In some embodiments, the probability score of the expanded search region is calculated. In some embodiments, an expanded portion of the search region is accepted (e.g., included into the search region) or rejected (e.g., not included into the search region) based on the probability score of the expanded search region. In some embodiments, the probability score of the expanded portion of the search region is calculated. In some embodiments, an expanded portion of the search region is accepted (e.g., included into the search region) or rejected (e.g., not included into the search region) based on the probability score of the expanded portion. In some embodiments, following acceptance or rejection of the expanded portion, the search region (or initial search region) is expanded in a different direction. In some embodiments, the search region is expanded orthogonally to the prior expansion. In some embodiments, the search region is expanded at an angle of 90°, 180°, or 270° to the prior expansion. In some embodiments, following acceptance or rejection of the expanded portion, the search region (or initial search region) is expanded in a direction 90° clockwise to the prior expansion. In some embodiments, following acceptance or rejection of the expanded portion, the search region (or initial search region) is expanded in a direction 90° counterclockwise to the prior expansion. In some embodiments, each subsequent expansion is of the same distance. In some embodiments, each subsequent expansion is of the same proportion to the prior search region. In some embodiments, each expansion of the search region is analyzed for probability score and/or object-of-interest properties and accepted or rejected. In some embodiments, the steps of expansion, calculating probability score (or analyzing properties), and accepting or rejecting the expansion are repeated until expansion in each direction meets or exceeds an edge of the MBR or it does not result in an expanded portion acceptable for inclusion in the search region.

In some embodiments, the steps of expansion, calculating probability score (or analyzing properties), and accepting or rejecting the expansion are repeated until expansion in each direction consecutively meets or exceeds an edge of the MBR or it does not result in an expanded portion acceptable for inclusion in the search region. For example, if the expansion in direction 0° is rejected, but one of the following expansions (e.g. in the direction 90°, 180°, or 270°) is accepted, the 0° direction would again be searched in a subsequent round of analysis. In these embodiments, calculating probability score (or analyzing properties) and accepting or rejecting the expansion is halted only when expansion in each of the four directions (e.g. 0°, 90°, 180°, and 270°) consecutively 1) fail to yield an expanded portion acceptable for inclusion in the search region, (2) meets or exceeds an edge of the MBR is the process of expansion, or (3) a combination thereof.

In some embodiments, a final search region or fully expanded search region (e.g., a search region that has been expanded to the boundaries of the MBR and/or the edge of the region above probability-score threshold) is analyzed to determine whether or not an object of interest is present, likely present, unlikely to be present, not present, etc. In some embodiments, the final probability score of the fully expanded search region is used to indicate the presence or absence of an object of interest within the search region (e.g., within the bounds of the MBR, within the image, within the container, etc.). In some embodiments, a likelihood score, related to (e.g., proportional to) the probability that an object is present, is assigned to the search region, MBR, and/or container.

In some embodiments, provided herein is a method of detecting the presence of a laptop in a piece of luggage comprising one or more (e.g. all) of the steps of: (a) obtaining a dual energy x-ray image of the piece of luggage; (b) analyzing the image for characteristic features of a laptop, wherein the characteristic features comprise features selected from: materials present, number of homogeneous segments, size of homogeneous segments, density of material, and presence of a circuit board; (c) combining the characteristic features into a combined-features laptop probability score for one or more pixels (e.g., each pixel) of the image, wherein the combined features laptop probability score is proportional to the probability that a pixel contains a portion of the laptop; (d) binarizing the image according to a threshold combined-features laptop probability score; (e) identifying continuous regions of pixels above the threshold; (f) applying one or more minimum bounding rectangles to the image, wherein each minimum bounding rectangle encompasses a single continuous region of pixels above the threshold; (g) analyzing laptop properties within the minimum bounding rectangles, wherein the laptop properties comprise properties selected from: size of minimum bounding rectangle, mean gray value of metal image, standard deviation of gray value of metal image, fraction of pixels with very high metal content, fraction of pixels with very low metal content, fraction of pixels with very low non-metal content, and aspect ratio of the rectangle; (h) calculating a minimum bounding rectangle laptop probability score, wherein the minimum bounding rectangle laptop probability score is a composite of the laptop properties, and wherein the minimum bounding rectangle laptop probability score provides a likelihood that the minimum bounding rectangle encompasses a laptop; (i) creating one or more subregions within a minimum bounding rectangle; (j) calculating subregion laptop probability scores for each the subregion, wherein the subregion laptop probability score is a composite of the laptop properties, and wherein the subregion laptop probability score provides a likelihood that the subregion encompasses a laptop; (k) selecting the subregion with the highest laptop probability score to be an initial search region; (l) expanding the initial search region in one dimension; (m) calculating the laptop probability score for the expanded portion and/or the expanded search region; n) accepting or rejecting the expanded portion into the search region based on the probability score of the expanded portion and/or the expanded search region; (o) expanding the search region in a different dimension to the previous expansion (e.g., orthogonal to the previous expansion; 90°, 180°, or 270° to the previous expansion, etc.); (p) repeating steps (m) through (o) until) expansion in each direction results in: (1) an edge of the minimum bounding rectangle is reached, or (2) does not result in an expanded portion with a probability score above a threshold value, thereby producing a final search region with a final size and a final subregion laptop probability score; and (q) determining whether a laptop exist within the piece of luggage based on the final size and/or final probability score of the search region. In some embodiments, determining whether a laptop exists within the container is based on the final size of the final search region. In some embodiments, determining whether a laptop exists within the container is based on the final probability score of the final search region. In some embodiments, determining whether a laptop exists exist within the container is based on both the final size and the final probability score of the final search region. In some embodiments, steps (m) through (o) are repeated until consecutive expansions in each direction result in: (1) an edge of the minimum bound rectangle being reached, (2) an expanded portion and/or expanded search area with a probability score below a threshold value, or (3) combinations thereof; thereby producing a final search region with a final size and a final subregion laptop probability score. In some embodiments, one or more of steps (a)-(q) are performed in the above listed order. In some embodiments, one or more of steps (a)-(q) are performed in an order other that the above listed order.

In some embodiments, provided herein are methods of detecting the presence of an object of interest in a container comprising one or more (e.g. all) of the steps of: (a) obtaining a dual energy x-ray image of the container; (b) identifying regions of the image with one or more features that are characteristic of the object of interest; (c) circumscribing the regions from step (b) (e.g., by applying a minimum bounding rectangle or other shape to the image, wherein the minimum bounding rectangle encompasses the regions); (d) selecting one or more subregions within the circumscribed region; (e) calculating subregion probability scores for each subregion, wherein the subregion probability score provides a likelihood that the subregion contains a portion of the object of interest, and wherein the subregion probability score is based upon the features that are characteristic of the object of interest; (f) selecting the subregion with the highest subregion probability score as the search region; (g) expanding the search region in one dimension; (h) calculating a probability score for the expanded portion of the search region; (i) accepting or rejecting the expanded portion into the search region based on the probability score of the expanded portion; (j) repeating steps (g) through (i) until: (1) an edge of the minimum bound rectangle is reached, or (2) expansion in every direction does not result in an expanded portion with a probability score above a threshold level, thereby providing a final search region of final shape and final probability score; and (k) determining whether the object of interest exist within the contained based on the final size and/or final probability score of the final search region. In some embodiments, determining whether the object of interest exist within the container is based on the final size of the final search region. In some embodiments, determining whether the object of interest exist within the container is based on the final probability score of the final search region. In some embodiments, determining whether the object of interest exist within the container is based on both the final size and the final probability score of the final search region. In some embodiments, steps (g) through (i) until expansion is each of four dsdirections consecutively: (1) reach an edge of the minimum bound rectangle, (2) do not result in an expanded portion with a probability score above a threshold level, or (3) combinations thereof. In some embodiments, one or more of steps (a)-(k) are performed in the above listed order. In some embodiments, one or more of steps (a)-(k) are performed in an order other that the above listed order.

DESCRIPTION OF THE FIGURES

FIG. 2 shows a scheme for weighting individual features to achieve a combined-features probability score from DEXI.

DEFINITIONS

Figure 1A:
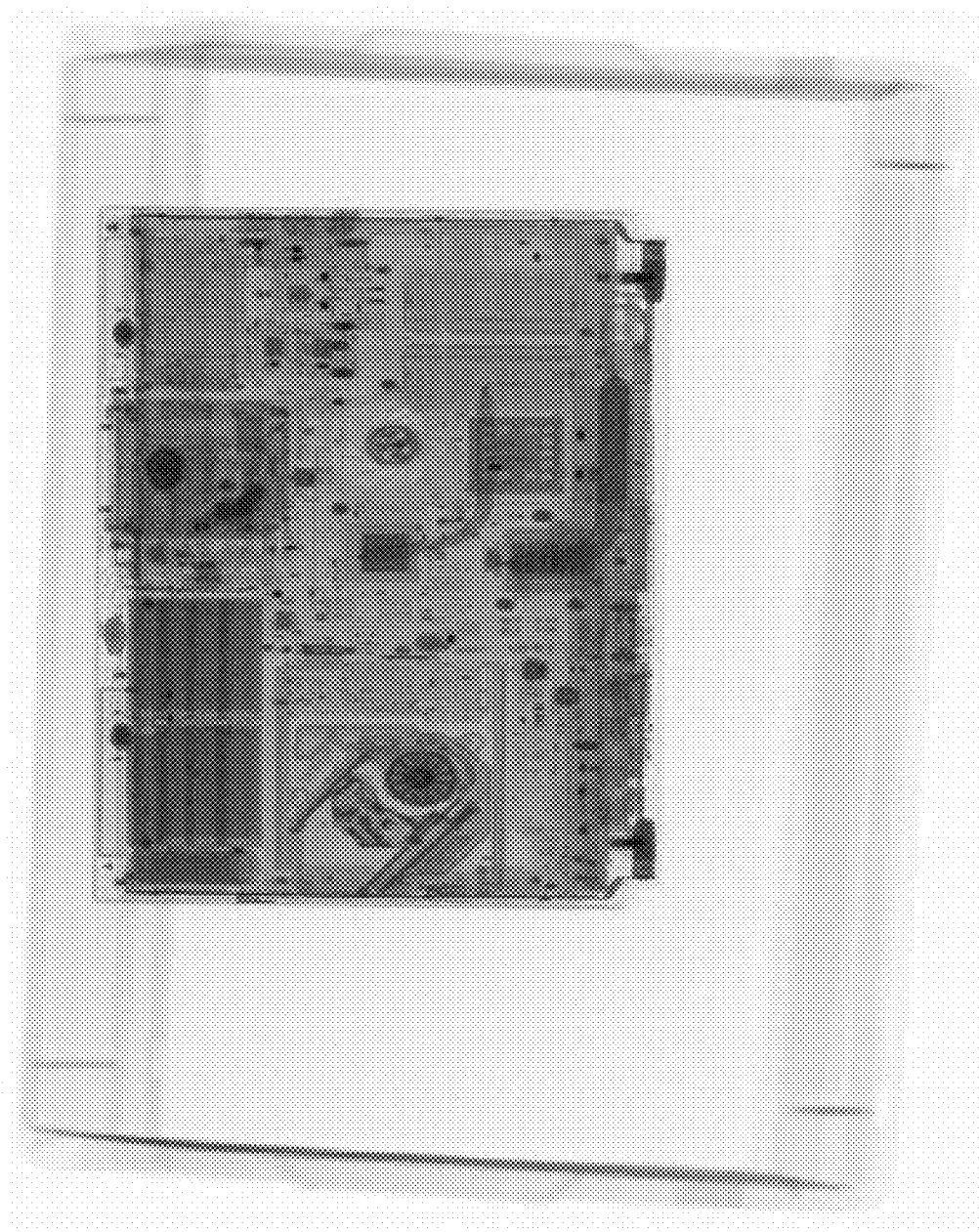
FIGS. 1A-B show DEXI of a laptop in a security screening bin, as view (A) from above (horizontal-search) and (B) from the side (vertical-search).

As used herein, the term "container" refers to any object, device, article, receptacle, or vessel capable of, configured to, and/or utilized for containing, storing, packaging, portioning, or shipping objects, items, and/or compositions. Specific examples of such containers include, among others, boxes, cups, clam shells, cartons, cases, crates, bags, sacks, envelopes, luggage, or other types of holders.

As used herein, the term "object of interest" refers to any object, device (e.g., laptop computer), composition, etc. that a user or other entity wishes to detect and or identify (e.g., object within a container). Examples of users or entities attempting to detect or identify the object of interest include, but are not limited to: airport security, other security details (e.g., to prevent unauthorized items being brought within a secured area, to prevent theft of items, etc.), customs agents, police, military forces, etc.

As used herein, the term "polygon" refers to a shape that is bounded by a closed path composed of a finite sequence of straight line segments (i.e., by a closed polygonal chain). A polygon may have convex and/or non-convex angles, and the edges of the polygon may not cross each other.

DETAILED DESCRIPTION OF THE INVENTION

The following description provides exemplary embodiments. The invention is not limited to these exemplary embodiments. For example, in some embodiments, provided herein are systems, devices, and methods for the detection of an object of interest within a container; however, many embodiments described herein specifically describe the object as being a laptop computer (a.k.a. "laptop") and the container being a piece of luggage (a.k.a. "luggage"). Embodiments specifically describing detection of a laptop within luggage should be viewed as more broadly applicable to the detection or identification of other objects of interest within other containers. Likewise, embodiments describing generally detection of an object of interest should be viewed as applicable to the detection or identification of a laptop.

In some embodiments, provided herein are devices, systems, and methods for the detection of objects (e.g., laptop computers) within containers (e.g., luggage). Embodiments described herein find use in security and screening applications (e.g., airport security, event security, building security, customs, etc.). In some embodiments, provided here are methods for the detection of a laptop within luggage (e.g., checked luggage, carry-on luggage, etc.). In some embodiments, methods are provided for the detection of any object of interest (e.g., rectangular object) that has characteristics (e.g., materials, density, component organization, etc.) that are distinguishable from background and/or the object's surroundings.

In some embodiments, one or more search algorithms are applied to an image (e.g., dual energy x-ray image) of a container (e.g., bag, luggage, box, etc.) to identify or detect an object of interest within the container. In some embodiments, distinguishable regions within the image (e.g., above a threshold) are identified as search regions. In some embodiments, a subregion (e.g., rectangular subregion) is selected (e.g., randomly, at center of region, highly distinguishable region, etc.) within a search region. In some embodiments, the subregion is allowed to expand in one or more directions (e.g., 1, 2, 3, 4). In some embodiments, following each expansion step, the newly expanded subregion is analyzed to determine the likelihood that the subregion contains an object of interest (e.g., laptop computer). In some embodiments, following each expansion step, the newly expanded subregion is analyzed to determine the likelihood that the subregion contains a portion of an object of interest (e.g., laptop computer). In some embodiments, if the probability that an object of interest is contained within the newly expanded subregion, or the newly expanded portion thereof, is not sufficiently high (e.g., above a probability threshold), expansion is stopped in that direction. In some embodiments, after any step, if expansion in that direction does not increase the likelihood that an object of interest is located within the subregion, expansion is stopped in that direction. In some embodiments, properties of the object of interest are used to analyze the likelihood that an object of interest is contained within a subregion or newly expanded portion thereof. In some embodiments, expansion is carried out until it has been stopped in each direction. In some embodiments, there exists a high probability (e.g., above a threshold) that the resulting fully-expanded region encompasses an object of interest (e.g. laptop computer).

In some embodiments, dual energy x-ray imaging (DEXI) is employed to generate that analyzed image. In some embodiments, DEXI systems use images generated at different x-ray energies, in order to distinguish between materials of different atomic composition (e.g., metals and non-metals). In these systems, x-ray measurements at two energies may be used for selective material imaging. This approach is made possible because x-rays undergo different types of interactions with matter, at different energies. For example, in the range of x-ray energies up to 200 keV, x-rays interact with matter primarily through the Compton and photoelectric interactions. These two types of interactions depend differently on the energy of the incident x-rays: the cross-section for Compton scattering is proportional to the electron density of x-ray target material, while the photoelectric cross-section is proportional to the electron density times the atomic number (Z) cubed. By separately measuring x-ray attenuation at low and high energies, the Compton and photoelectric interactions can be independently measured. The results of the measurements depend on the type of the x-ray target material, not on the thickness or density of the target material. In the dual energy transmission method, an object typically is scanned using a collimated x-ray fan beam of broad spectral range emanating from a Bremsstrahlung source; although any method of obtaining a dual-energy x-ray image finds use in the methods described herein. In some embodiments, x-rays transmitted through the object are detected by a first detector that is sensitive to low energy x-rays but passes high energy x-rays. A filter follows and serves to attenuate any remaining low energy x-rays. A second detector detects the transmitted high energy x-rays. Thus the data are separated into two broad energy bins. Any suitable means for separately detecting low and high energy x-rays may find use in embodiments described herein. From low energy and high energy data an average atomic number of what is being inspected is obtained. This is possible because the relative attenuation of low and high energy x-rays depends on the atomic number of the material. For example, a low atomic number object (e.g., an organic substance, plastic, non-metal, explosive, etc.) will have a fairly flat response to the x-ray spectrum under consideration; whereas a higher atomic number object (e.g., inorganic material, metal, etc.) object will preferentially attenuate the low energy x-rays over high energy x-rays. Objects and material can be scored based on their relative attenuation to determine the material composition.

In some embodiments, DEXI is used to produce a "metal image," and a "non-metal image" or "plastic image". This means that two specific materials (like one metal and one plastic material) are selected for a coordinate transformation of the high/low representation of the X-ray image. In some embodiments, comparison or combination of the metal image and non-metal image for a portion of the imaged region identifies the material within that region. In some embodiments, comparison or combination of the metal image and non-metal image for a portion of the imaged region provides data regarding the identity of the material within that region. Materials (e.g., tin, silicon, iron, aluminum, polyurethanes (PU), acrylonitrile-butadiene-styrene (ABS), copper, gold, dioxins, polychlorinated biphenyls (PCBs), cadmium, chromium, radioactive isotopes, mercury, lead, etc.) can be expressed by a metal contribution and a non-metal contribution (e.g., 2 mm steel and 5 inches plastic). In some embodiments, methods of determining the % metal and % non-metal content for a material or region of an image are provided herein. In some embodiments, the metal contribution and a non-metal contribution are determined from interpretation and/or analysis of the metal and non-metal images obtained from DEXI.

In some embodiments, an entire image is evaluated according to one or more criteria (e.g., 1, 2, 3, 4, 5, 6, 7, 8, 9, 10, or more) to identify features within the image that are characteristic of an object of interest. In some embodiments, one or more portions of an image are evaluated according to one or more criteria to identify features within the image that are characteristic of an object of interest. In some embodiments, features that are evaluated for the entire image, and/or a portion thereof, include but are not limited to materials present, density of materials, presence of circuit board(s), number of homogeneous segments, size of homogeneous segments, shapes of homogeneous segments, etc. In some embodiments, the materials present is evaluated by the % metal/% non-metal calculated at regularly spaced intervals across the image (e.g., every 0.1 mm, every 0.2 mm, every 0.5 mm, every 1 mm, every pixel, etc.). In some embodiments, the density and/or thickness of a portion of the image is evaluated by evaluating the darkness of the image at regularly spaced intervals across the image (e.g., every 0.1 mm, every 0.2 mm, every 0.5 mm, every 1 mm, every pixel, etc.). In some embodiments, a DEXI image provides (1) the materials present in an image, and (2) the density and/or thickness of materials present. In some embodiments, adjacent pixels of the image comprising the same material and density (or similar material and/or density) are grouped into homogeneous segments. In some embodiments, homogeneous segments are used to identify components (e.g., hard drive, circuit board, etc.) of an object of interest (e.g., laptop). In some embodiments, the size, shape, density, and materials of homogeneous segments are used to identify known components or regions with increased likelihood of containing an object of interest.

In some embodiments, a large area (e.g., 4 cm$^2$ to 20 cm$^2$) with a correspondingly small average segment size (e.g., 1 mm$^2$ to 10 mm$^2$) is indicative of the presence of a laptop computer. In some embodiments, the presence of more than 50 homogeneous segments (e.g., >50, >75, >100, >200, etc.) over a large region (e.g. 200 cm$^2$ to 1000 cm$^2$) is indicative of the presence of a laptop computer. In some embodiments, the presence of more than 200 homogeneous segments (e.g., >200, >300, >400, >500, >1000, etc.) is indicative of the presence of a laptop computer.

In some embodiments, a feature probability score is generated for one or more characteristic features of an object of interest (e.g., materials, density, segment size, etc.). In some embodiments, a single feature probability score is generated for each feature over the entire image. In some embodiments, feature probability scores include, but are not limited to materials probability score (e.g., based on the presence and/or proportion of materials), density probability score (e.g., based on the measurement of densities corresponding to an object of interest), segment-size probability score (e.g., based on the presence of homogeneous segments of appropriate size for an object of interest), segment-number probability score (e.g., based on the presence of an appropriate number of homogeneous segments for an object of interest), segment-shape probability score (e.g., based on the presence of homogeneous segments of appropriate shape for an object of interest), component probability score (e.g., based on the presence of regions resembling required components (e.g., circuit board, hard drive, etc.) of an object of interest), etc. In some embodiments, feature probability scores are generated portions of the image. In some embodiments, feature probability scores are generated for each feature at each pixel of the image. In some embodiments, each feature probability score is an individual measurement of the likelihood that an object of interest is contained within the image (or within any given portion or pixel).

In some embodiments, characteristic features of an object of interest are combined to provide a combined-features probability score. In some embodiments, feature probability scores are combined to provide a combined-features probability score. In some embodiments, a combined-features probability score utilizes the features within the image that are characteristic of an object of interest to evaluate the likelihood that an object of interest is depicted in the image. In some embodiments, individual feature probability scores are differentially weighted in calculating a combined-feature probability score. In some embodiments, a combined-features probability score is related to the likelihood that an object of interest is contained within the image. In some embodiments, a combined-features probability score is generated for the entire image to assist in evaluating the likelihood that the image contains one or more objects of interest. In some embodiments, a combined-features probability score is generated for portions of the image. In some embodiments, a combined-features probability score is generated for each pixel in the image. In some embodiments, a combined-features probability score indicates the likelihood that an image, portion thereof, or individual pixel contains an object of interest or a portion thereof. In some embodiments, combined-features probability scores for portions of an image and pixels are influenced by the scores of surrounding portions and/or pixels.

In some embodiments, thresholds are provided as selection criteria (e.g., for various probability scores used in embodiments described herein (e.g., feature probability score, combined-features probability score, minimum bounding rectangle laptop probability score, etc.)). Thresholds may be selected by any suitable method. In some embodiments, a threshold is static, despite the objective of the implementation of the methods described herein. In some embodiments, a threshold is dynamic according to changing parameters or conditions of use of the methods described herein. In some embodiments, thresholds are set and/or determined manually (e.g., by a user). In some embodiments, thresholds are set according to the desired level of selectivity desired (e.g., eliminate all false positives, eliminate all missed detection, or levels of selectivity therein). In some embodiments, thresholds are automatically adjusted according to data collected during operation of the method (e.g., thresholds are adjusted following a false identification or a missed detection). In some embodiments, thresholds are empirically determined (e.g., through the use of test objects (e.g., laptop and not-laptop) in a test screening). In some embodiments, thresholds are based on experimental values using a "control" object. In some embodiments, thresholds are flexible, to allow for varying degrees of certainty under different conditions and settings (e.g., Whitehouse security vs. baseball game security).

In some embodiments, pixels of an image are sorted into bins according to combined-features probability scores. In some embodiments, pixels are sorted as either exceeding or failing to meet a combined-features probability threshold. In some embodiments, a combined-features probability indicates the percentage likelihood that a pixel contains a portion of an object of interest (e.g., >1% . . . >2% . . . >10% . . . >20% . . . >30% . . . >40% . . . >50%, etc.). In some embodiments, pixels are sorted as falling either above or below a single threshold. In some embodiments, pixels are sorted into multiple bins according to multiple combined-features probability thresholds according to the probability that a pixel contains a portion of an object of interest (e.g., 0-1% . . . 1-2% . . . 2-5% . . . 5-10% . . . 10-20% . . . 20-30% . . . 30-40% . . . 40-50% . . . >50, or other ranges therein). In some embodiments, "high-bin pixels" are those pixels exceeding a threshold or falling into one of multiple bins above a threshold (e.g., all bins with greater than 5% likelihood). In some embodiments, regions likely containing an object of interest are identified based on contiguous groupings of high-bin pixels. In some embodiments, an image is searched for regions of sufficient size (e.g., at least the size of an object of interest (e.g., laptop)) containing all or primarily (e.g., >50% . . . >75% . . . >90% . . . >95% . . . >99%) high-bin pixels. In some embodiments, contiguous regions of high-bin (e.g., above a minimum threshold) pixels of insufficient size are sorted out and/or excluded from subsequent searching. In some embodiments, contiguous regions of low-bin (e.g., below a bottom threshold) pixels are sorted out and/or excluded from subsequent searching.

In some embodiments, regions not excluded as not meeting a combined-features probability threshold or for being of insufficient size are circumscribed by a contour line and/or polygon. In some embodiments, selected pixels (e.g., those meeting threshold and contiguous pixels size requirements) are circumscribed by a contour line and/or polygon. In some embodiments, a contour line circumscribes one or more regions selected for subsequent analysis. In some embodiments, a contour line directly separates selected pixels from non-selected pixels. In some embodiments, a contour line includes a buffer zone of non-selected pixels surrounding the selected pixels (e.g., to ensure that all possible locations of an object of interest are searched). In some embodiments, a polygon circumscribes all selected pixels using straight lines and angles. In some embodiments, a polygon includes a portion of non-selected pixels in addition to all the selected pixels (e.g., those meeting threshold and contiguous pixels size requirements). In some embodiments, a polygon encompasses a contour line circumscribing the selected pixels. In some embodiments, a minimum bounding rectangle (MBR) that encompasses all the selected pixels is applied to the image. In some embodiments, an MBR encompasses the contour line circumscribing the selected pixels. In some embodiments, an MBR encompasses the polygon circumscribing the selected pixels. In some embodiments, an MBR is applied in any orientation so determined. In some embodiments, an MBR is of any orientation with respect to the image and/or selected pixels and/or the coordinate axis. In some embodiments, an algorithm is used to generate an MBR (e.g., from a polygon and/or circumscribing line), for example, Toussaint. Proceedings of IEEE MELECON'83, Athens, Greece, May 1983; herein incorporated by reference in its entirety. In some embodiments, an MBR is oriented and sized in order to apply a minimally sized rectangle that encompasses: all selected pixels, the contour line, and/or the polygon. In some embodiments, an MBR is a rectangle of the minimum dimensions (e.g., length and height) that encompasses: all selected pixels, the contour line, and/or the polygon. In some embodiments, an MBR is a rectangle of the minimum area that encompasses: all selected pixels, the contour line, and/or the polygon.

In some embodiments, properties characteristic of an object of interest (e.g., laptop properties) are analyzed within the MBR. In some embodiments, properties of the image within the MBR are analyzed. In some embodiments, probability scores are calculated for the pixels within the MBR, based on analyzed properties. In some embodiments, probability scores are calculated for the entire MBR, based on analyzed properties. In some embodiments, analyzed properties may include, but are not limited to: the average gray value of the metal image, standard deviation of gray levels of the metal images, the proportion of pixels with low or very low metal content, the proportion of pixels with high or very high metal content, the proportion of pixels with low or very low non-metal content, the proportion of pixels with high or very high non-metal content, the aspect ratio of the rectangle, etc. In some embodiments, any of the properties are analyzed in the horizontal-search orientation and/or vertical-search orientation. In some embodiments, regions containing properties that are not consistent with the object of interest are excluded. In some embodiments, MBR's with overall properties (e.g., probability score, combined-properties probability score, etc.) that are not consistent with an object of interest are excluded. In some embodiments, MBR's with properties consistent with an object of interest are subjected to further searching.

In embodiments in which the object of interest is a laptop, analyzed properties may include, but are not limited to: average gray value of the metal image, standard deviation of gray levels of the metal images, the proportion of pixels with very low metal content, the proportion of pixels with very high metal content, the proportion of pixels with very low non-metal content, and the aspect ratio of the rectangle.

In some embodiments in which the object of interest is a laptop, the average gray value of the metal image is calculated in the horizontal-search and/or vertical-search orientations. In some embodiments, regions and/or an MBR with a low average grey value of the metal image are identified as not containing a laptop and are excluded from further searching.

In some embodiments in which the object of interest is a laptop, the standard deviation of gray levels of the metal images is calculated in the horizontal-search and/or vertical-search orientations. In some embodiments, laptops have many small components and therefore the metal image is very inhomogeneous (e.g., high standard deviation). In some embodiments, regions and/or an MBR with standard deviations identified as not consistent with a laptop are excluded from further searching. In some embodiments, the proportion of pixels within the MBR having very low metal content (e.g., <25%, <15%, <5%, <1%, <0.1%, and thresholds therein) is calculated in the horizontal-search and/or vertical-search orientations. In some embodiments, the screen of a laptop contains a significant amount of metal; therefore, the proportion of very low metal content pixels (e.g., very dark pixels in the metal image) is small in a region of an image containing laptop. However, other objects (e.g., electrical cables, smaller electronic units, coins, etc. commonly contain spaces between objects with no metal content, and are therefore differentiated from a lapotop. As such, in some embodiments, regions with a moderate proportion (e.g., >20%, >30%, >40%, >50%, >60%, >70%, and thresholds therein) and/or large proportion (e.g., >50%, >60%, >70%, >80%, >90%, and thresholds therein) of pixels with very low metal content (e.g., <25%, <15%, <5%, <1%, <0.1%, and thresholds therein) are excluded from further searching.

In some embodiments in which the object of interest is a laptop, the proportion of pixels with very high metal content is calculated in the horizontal-search and/or vertical-search orientations. A laptop is viewed from the side (e.g., vertical-search orientation) will exhibit a high proportion of pixels (e.g., >50%, >60%, >70%, >80%, >90%, and thresholds therein) with very high metal content (e.g., >70%, >80%, >90%, >95%, >99%, and thresholds therein). In some embodiments, regions and/or MBR's not exhibiting this property can be excluded from further searching. A laptop viewed from above (e.g., horizontal-search orientation) exhibits a moderate proportion of pixels with high metal content. Regions or MBR's lacking pixels with high metal content are excluded from further searching.

In some embodiments in which the object of interest is a laptop, the proportion of pixels with very low non-metal content is calculated in the horizontal-search and/or vertical-search orientations. Laptops commonly contain components comprising at least a moderate amount of non-metal, organic, and/or plastic material. Therefore, in some embodiments, regions and/or MBR's containing too high a proportion of pixels with very low non-metal content (e.g., <25%, <15%, <5%, <1%, <0.1%, and thresholds therein) are excluded from further searching.

In some embodiments in which the object of interest is a laptop, the aspect ratio of the MBR is calculated in the horizontal-search and/or vertical-search orientations. Laptop computers have predictable sizes and scales. For example from a side view (e.g., vertical orientation), a laptop is very flat and has a high ratio of the long dimension to the short dimension. In some embodiments, MBR's with aspect ratios that are not suitable or consistent with a laptop are excluded from further searching.

In some embodiments, a combined-properties probability score is calculated for the MBR or pixels therein, based on the analysis of properties within the MBR that are characteristic of the object of interest. In some embodiments in which the object of interest is a laptop, a combined-laptop-properties probability score is calculated for the MBR or pixels therein based on the laptop properties above. In some embodiments, properties are differentially weighted to provide a combined-properties probability score (e.g., combined-laptop-properties probability score). In some embodiments, a combined-properties probability score (e.g., combined-laptop-properties probability score) is calculated from the acquired properties using a ramp function with parameters and weightings configured to result in a combined-properties probability score (e.g., combined-laptop-properties probability score) that correlates with the likelihood of an object of interest being depicted in the image within the MBR. In some embodiments, if a combined-properties probability score (e.g., combined-laptop-properties probability score) exceeds a threshold score, further searching is performed. In some embodiments, if a combined-properties probability score (e.g., combined-laptop-properties probability score) fails to exceed a threshold score, the MBR, or a region thereof, is excluded from further searching. In some embodiments, if a combined-properties probability score (e.g., combined-laptop-properties probability score) exceeds a certainty threshold, it is determined that the MBR encompasses a region of the image depicting an object of interest (e.g., laptop).

In some embodiments, objects with similar or dissimilar properties to an object of interest, residing within the MBR (e.g., metal objects adjacent to a laptop computer) can skew the combined-properties probability score. In some embodiments, objects adjacent to an object of interest can cause a reduced combined-properties probability score. In some embodiments, in order to reduce and/or eliminate false exclusions, the entire MBR is not initially examined and/or scored. In some embodiments, a small region is selected within the MBR as an initial search region. In some embodiments, a combined-properties probability score is calculated for the initial search region. In some embodiments, the initial search region is allowed to increase in size and a combined-properties probability score is calculated for the expanded search region and/or expanded portion of the search region. In some embodiments, an expanded portion is accepted or rejected based on the combined-properties probability score of the expanded search region or the expanded portion thereof.

In some embodiments, one or more potential search regions (e.g., 1, 2, 3, 4, 5, 6, 7, 8, 9, 10 . . . 20 . . . 50, or more) are selected within the MBR. In some embodiments, the size and or number of the potential search regions are dependent upon the size of the MBR and the expected size of an object of interest. In some embodiments, a potential search area is a rectangle (e.g., a square). In some embodiments, a potential search region has an area 1% . . . 2% . . . 5% . . . 10% . . . 20% of the MBR. In some embodiments, each potential search area within an MBR has the same size. In some embodiments, each potential search area within an MBR has the same shape. In some embodiments, each potential search area within an MBR has the same orientation (e.g. with respect to: the image, the MBR, a coordinate axis, etc.). In some embodiments, potential search areas are overlapping and/or non-overlapping. In some embodiments, potential search areas are randomly distributed throughout the MBR. In some embodiments, potential search areas are evenly spaced throughout the MBR. In some embodiments, potential search regions are regularly spaced throughout the MBR (e.g., 2×1, 3×1, 2×2, 2-1-2, 3×2, 2-3-2, 3-2-3, 3×3 . . . 5-5-5-5-5, etc.). In some embodiments, combined-properties probability scores are calculated for each potential search region within the MBR. In some embodiments, the potential search region with the highest combined-properties probability score is selected as the initial search region. In some embodiments, one or more potential search regions with combined-properties probability scores above a threshold are selected as initial search regions. In some embodiments, when multiple initial search regions are selected, each initial search region is treated separately for subsequent and/or further searching.

In some embodiments, an initial search region has an initial combined-properties probability score above a threshold consistent with the presence of at least a portion of an object of interest being within the initial search region. In some embodiments, an initial search region is expanded one dimension, in a single direction. In some embodiments, the initial search region is expanded in a direction orthogonal to the side of the initial search region. In some embodiments, an initial search region is expanded by a distance of not more than 50% of the length of a side of the initial search region (e.g., 1% . . . 2% . . . 5% . . . 10% . . . 20% . . . 50%). In some embodiments, a combined-properties probability score is calculated for the expanded portion. In some embodiments, a combined-properties probability score is calculated for the expanded search region. In some embodiments, if the combined-properties probability score for the expanded search region, and/or expanded portion thereof, is above a threshold consistent with the presence of at least a portion of an object of interest being therein, the expanded portion is accepted into the search region. In some embodiments, if the combined-properties probability score for the expanded search region, and/or expanded portion thereof, is not above a threshold consistent with the presence of at least a portion of an object of interest being therein, the expanded portion is rejected and not incorporated into the search region. In some embodiments, whether the expanded portion is accepted into the search region or not, the search region (or initial search region) is expanded in a direction 90°, 180°, or 270° with respect to the first expansion. In some embodiments, the search region is expanded in a direction orthogonal to the prior expansion. In some embodiments, the search region is expanded the same distance as in the first expansion. In some embodiments, the search region is expanded a distance proportional, with respect to the size of the search region, to the first expansion. In some embodiments, a combined-properties probability score is again calculated for the expanded search region, and/or the expanded portion thereof, and the expansion is accepted or rejected based on a comparison of the combined-properties probability score to a threshold value. In some embodiments, an expansion is also rejected once the edge of the MBR is reached. In some embodiments, the process of expansion, calculating a combined-properties probability score, and accepting or rejecting the expanded portion into the search region is repeated, rotating the direction of the expansion by 90 degrees each cycle.

In some embodiments, expansion of the search area in any one direction is stopped after one expansion in that direction is rejected. In such embodiments, expansion in a direction that has been previously rejected is skipped in subsequent rounds of search region expansion. In some embodiments, if expansion in a first direction (e.g., 90°) is rejected, but expansion in a subsequent direction (e.g., 270°) is accepted, then expansion in the first direction will be repeated before halting the rounds of expansion. In some embodiments, each of four orthogonal directions are expanded and checked for acceptance in order, despite rejection of expansion in one direction in a precious cycle. In some embodiments, expansion must be consecutively rejected in each direction (e.g., X°, X+90°, X+180°, X+270°) in order to end the expansion of the search area. In some embodiments, the process of expansion, calculating a combined-properties probability score, and accepting or rejecting the expanded portion into the search region is halted once expansion in each direction: (1) meets or exceeds the edge of the MBR, (2) does not result in an expanded portion of a suitable combined-properties probability score, or a combination thereof. In some embodiments, once expansion in every orthogonal direction is rejected (e.g., due to expansion not meeting a combined-properties probability threshold or due to meeting an edge of the MBR), expansion is halted, thereby resulting in the final search region. In some embodiments, the process of expansion, calculating a combined-properties probability score, and accepting or rejecting the expanded portion into the search region is halted once expansion in each direction consecutively: (1) meets or exceeds the edge of the MBR, (2) does not result in an expanded portion of a suitable combined-properties probability score, or a combination thereof. In some embodiments, once expansion in every orthogonal direction is consecutively rejected (e.g., due to expansion not meeting a combined-properties probability threshold or due to meeting an edge of the MBR), expansion is halted, thereby resulting in the final search region. In some embodiments, once expansion in every orthogonal direction is rejected (e.g., consecutively rejected), the search region is expanded slightly (e.g., less than the distance of prior expansions) in every direction (e.g., to ensure that the final search region encompasses a potential object of interest), thereby resulting in the final search region.

In some embodiments, a combined-properties probability score is calculated for the final search region. In some embodiments, the size and dimensions of the final search region are measured. In some embodiments, based on the final combined-properties probability score and/or the size/shape of the final search region, the likelihood that an object of interest resides within the final search region, MBR, image, etc. is determined. In some embodiments, if the shape and/or size of the final search region is inconsistent with an object of interest, it is determined that an object of interest is not present (or not likely present). In some embodiments, if the final combined-properties probability score is below a threshold value, it is determined that an object of interest is not present (or not likely present). In some embodiments, if the final combined-properties probability score is above a threshold value, it is determined that an object of interest is present (or likely present).

In some embodiments, if it is determined that an object of interest is present or likely present, additional search and/or security procedures known in the art are performed on the container subjected to the methods described herein. In some embodiments, containers deemed to contain, or likely to contain, an object of interest (e.g., laptop) undergo physical inspection, manual inspection of images, additional imaging procedures, additional search algorithms, screening for explosives, search by canine, etc. In some embodiments, if it is determined that an object of interest is not present or unlikely to be present, addition search procedures are not performed on the container subjected to the methods described herein. In some embodiments, if it is determined that an object of interest is not present or unlikely to be present, the container subjected to the methods described herein is routed to a security/screening procedure with less scrutiny.

In some embodiments, method and procedures described herein are used with additional security and/or screening procedures known to those in the art. In some embodiments, methods and devices described herein are complements or replacements for traditional x-ray screening manual screening, metal detection, thermal imaging, chemical detection, canine screening, profiling, or other security/screening techniques. In some embodiments, the methods described herein are a portion of a more extensive screening process. In some embodiments, detection of an object of interest assists or is a step in detection or identification of explosives, drugs, or other contraband.

In some embodiments, devices and systems are provided for performing the search algorithms and methods described herein. In some embodiments, dual-energy x-ray imaging systems are provided. In some embodiments, computer equipment (e.g., CPU, monitor, keyboard, etc.) necessary for analyzing images and directing the methods described herein are provided. In some embodiments, a computer program product or software product that includes a computer readable medium having one or more logic instructions for directing the methods described herein is provided. In some embodiments, one or more databases or other data storage systems are provided. In some embodiments, data, applications, and instructions are accessed from a local computer and/or a remote computer over a network. In some embodiments, systems and/or devices for implementing methods described herein are incorporated into systems for security screening.

Experimental

The following example is an exemplary use of an embodiment of the methods described herein. This example is intended to demonstrate features of one potential embodiment, and should not be viewed as limiting the scope of the invention.

Figure 1B:
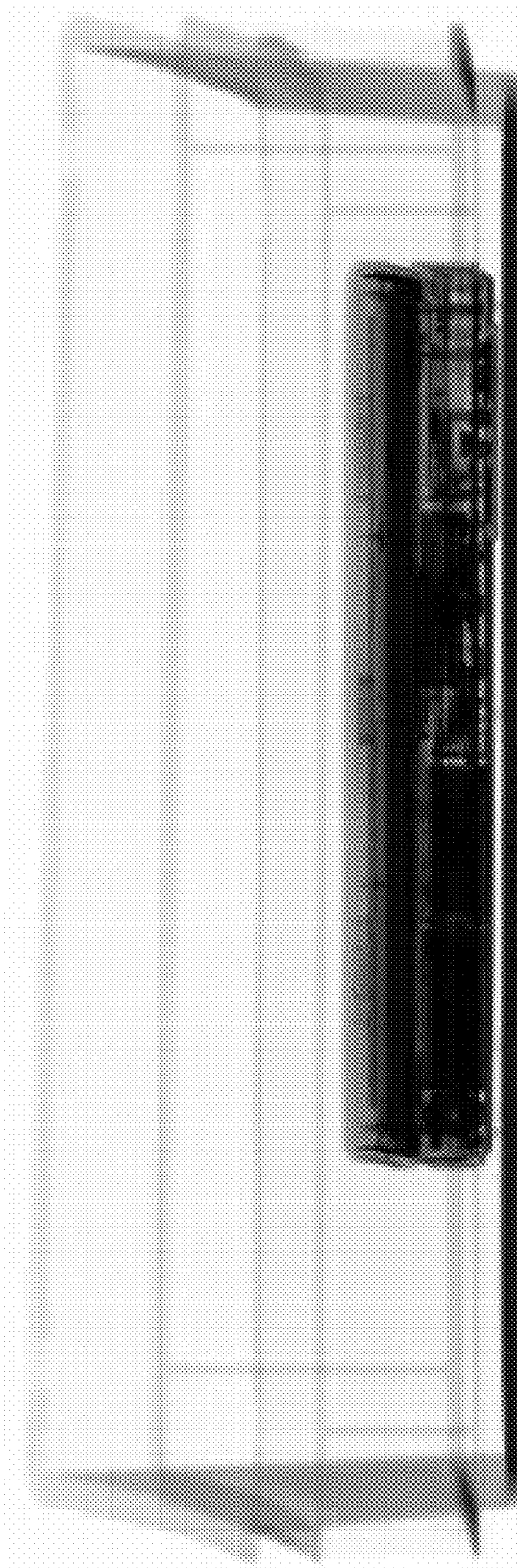
Figure 3A:
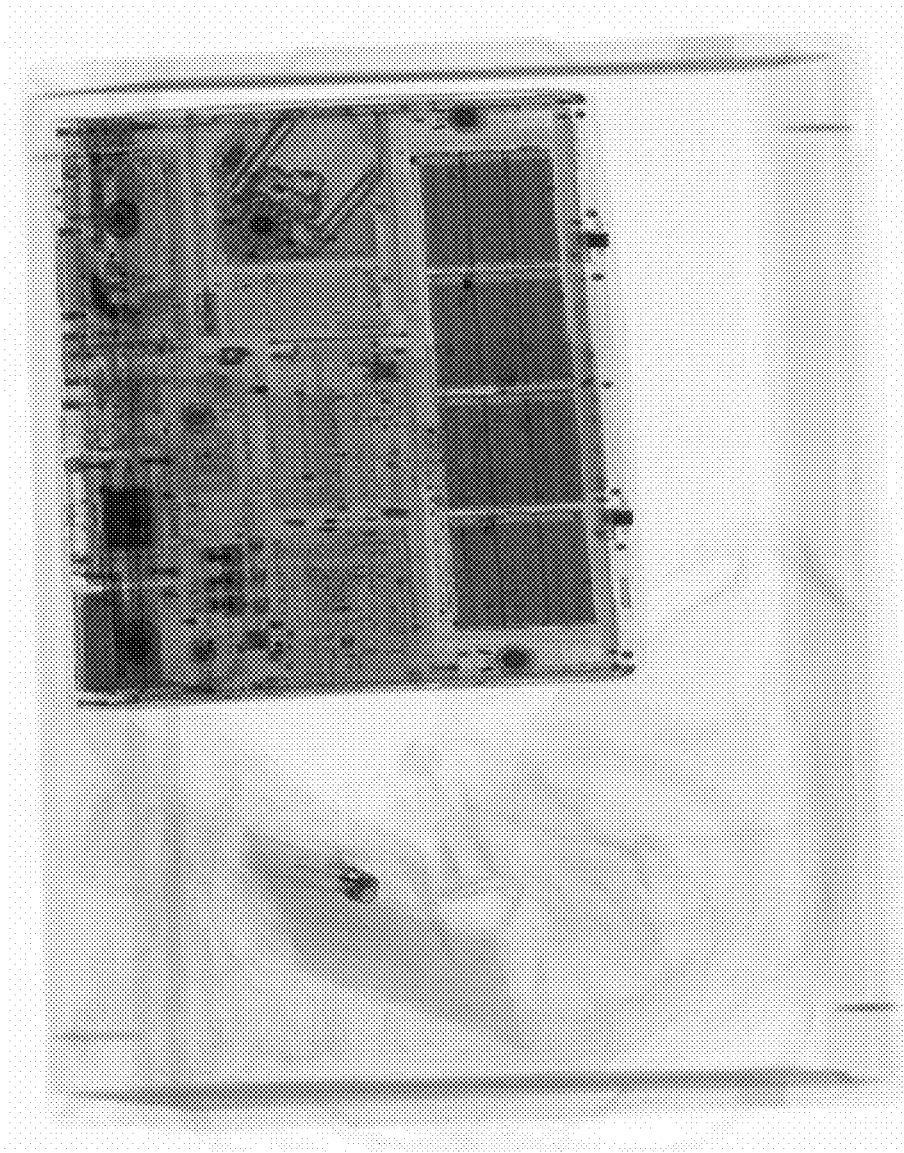
FIG. 3A shows DEXI of a laptop in a security screening bin.
Figure 3B:
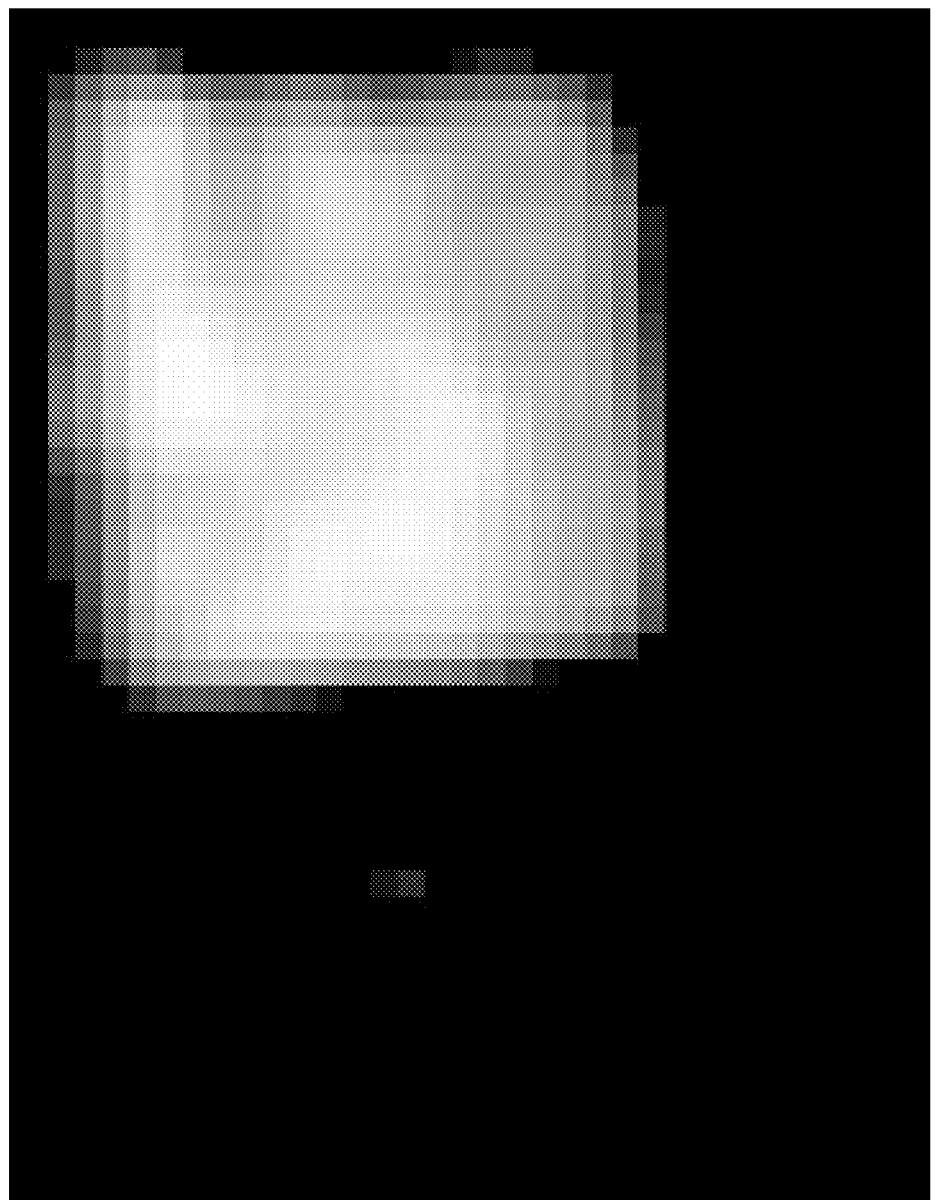
FIG. 3B shows the image from (A), where the grey values represent the combined-features probability.
Figure 4A:
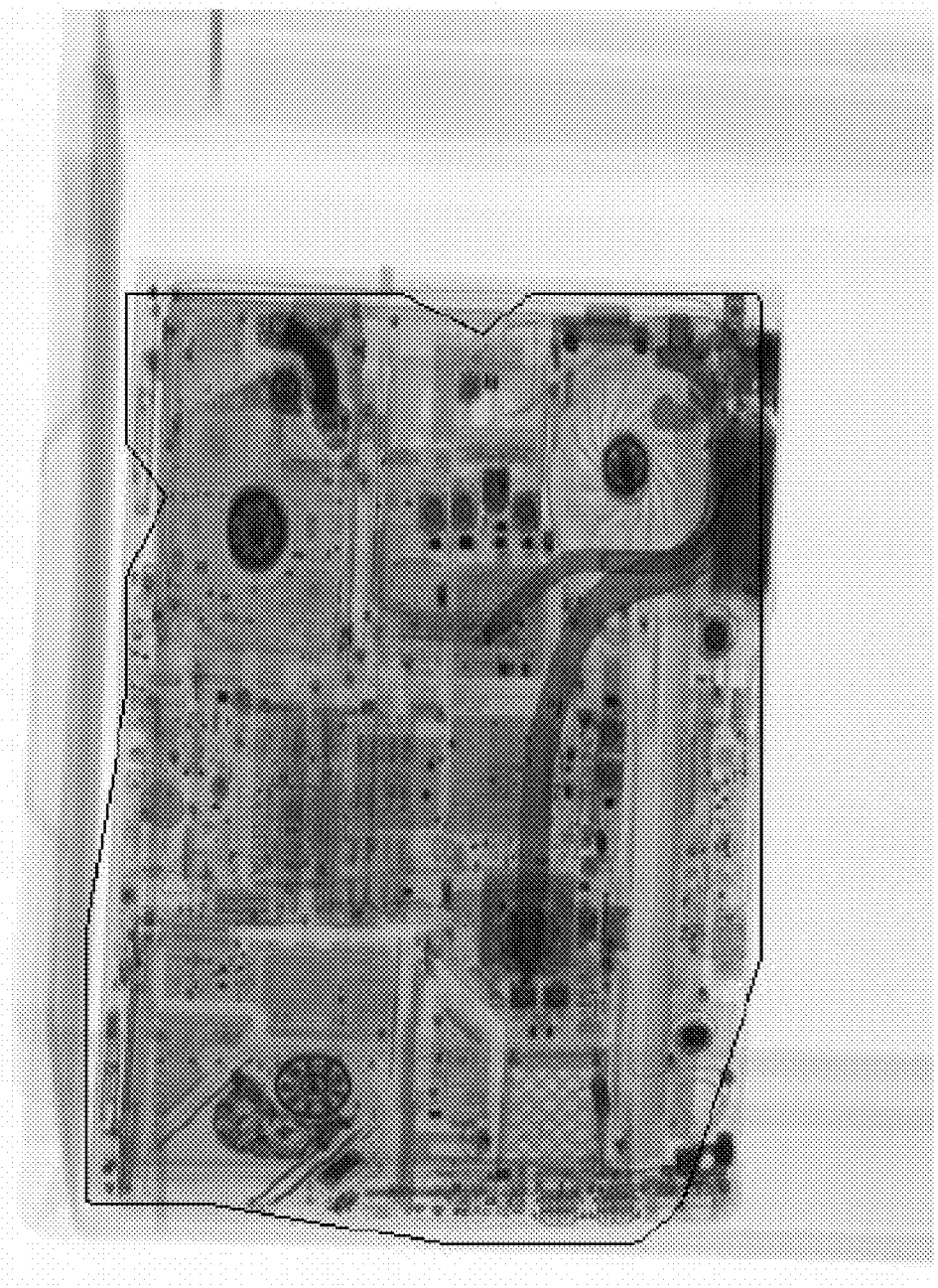
FIG. 4A shows polygon circumscribing regions of an image that exceed a combined features probability threshold.
Figure 4B:
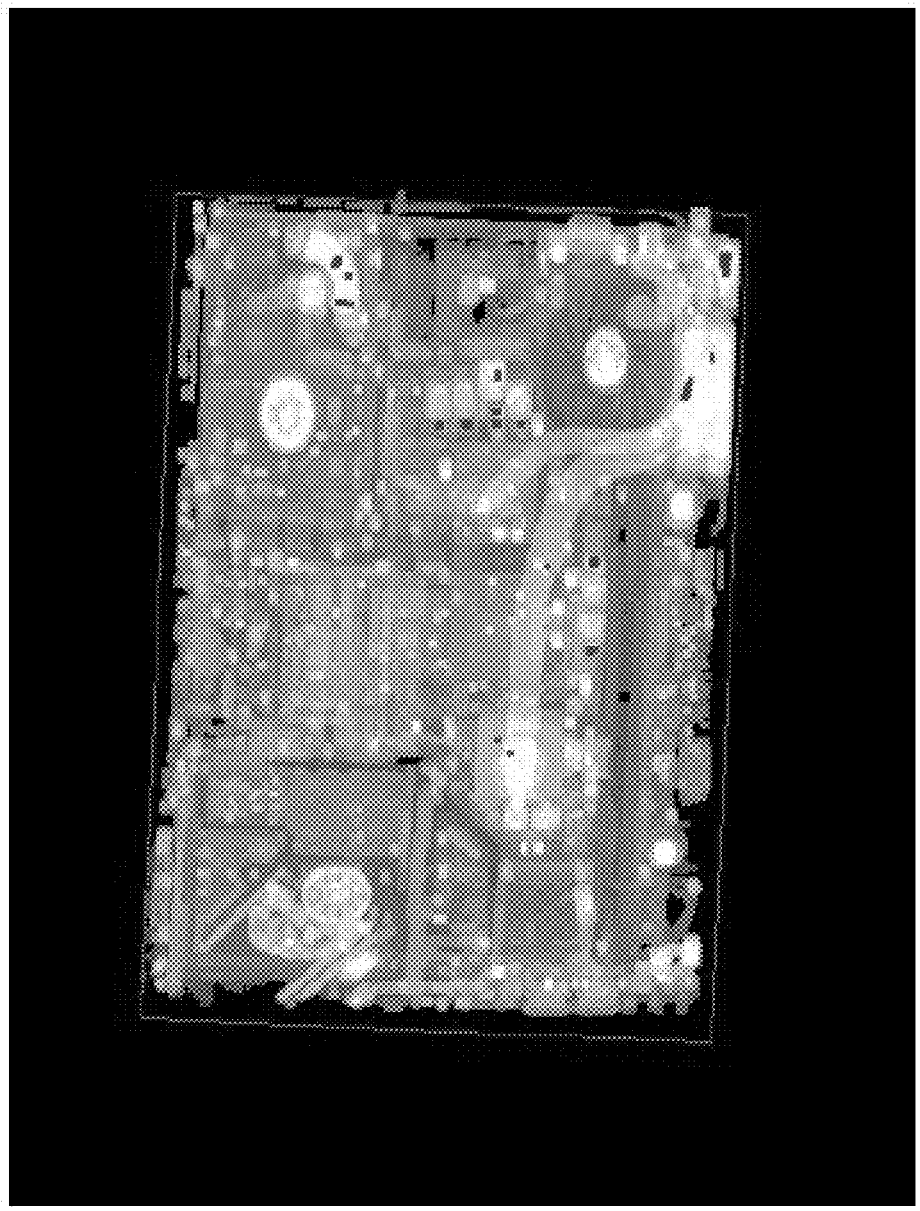
FIG. 4B shows a minimum bounding rectangle encompassing all contiguous pixels that exceed a combined features probability threshold.

Dual-energy x-ray images are obtained of a laptop computer within a plastic bin. Images are obtained from above (SEE FIG. 1A), to enable horizontal search of the bin, and from the side view (SEE FIG. 1B), to enable vertical search of the bin. Various features of the images are quantified, including: materials present, density of material, homogeneous segment size, and amount of metal present. These features are weighed and combined to estimate the probability that a laptop is present at any given location within the image (SEE FIG. 2), thereby producing a combined-features laptop probability score for each pixel. For each pixel of the DEXI image (SEE FIG. 3A) a combined-features laptop probability is determined, thereby creating a combined-features probability image (SEE FIG. 3B). Contiguous regions not meeting probability threshold, and contiguous regions meeting the threshold, but of insufficient size to contain a laptop, are excluded from further investigation. The remaining region is circumscribed by a contour line separating accepted and rejected pixels. A polygon is then applied to the image which encompasses the entire contour line (SEE FIG. 4A). The polygon is simplified to yield the minimum bounding rectangle (MBR), or the smallest rectangle, in any orientation that encompasses the entire accepted region (SEE FIG. 4B).

The properties of the area within the MBR are then analyzed. Specifically, properties relating the metal image and non-metal image obtained from DEXI are calculated for the area within the MBR. The properties include: the average gray value (thickness) of the metal image, standard deviation of gray level of the metal image, proportion of pixels having very low metal content, proportion of pixels having very high metal content, proportion of pixels having very low non-metal content, and the aspect ratio of the MBR. Each individual property can be used on its own to exclude an MBR from further investigation, based on the low probability that a laptop is depicted within that region of the image. For example, regions having a very low metal thickness can be excluded. Likewise, because laptops have many small elements, images with highly homogeneous metal thickness are excluded. The individual properties are then weighted and combined to provide a laptop probability score.

Figure 5A:
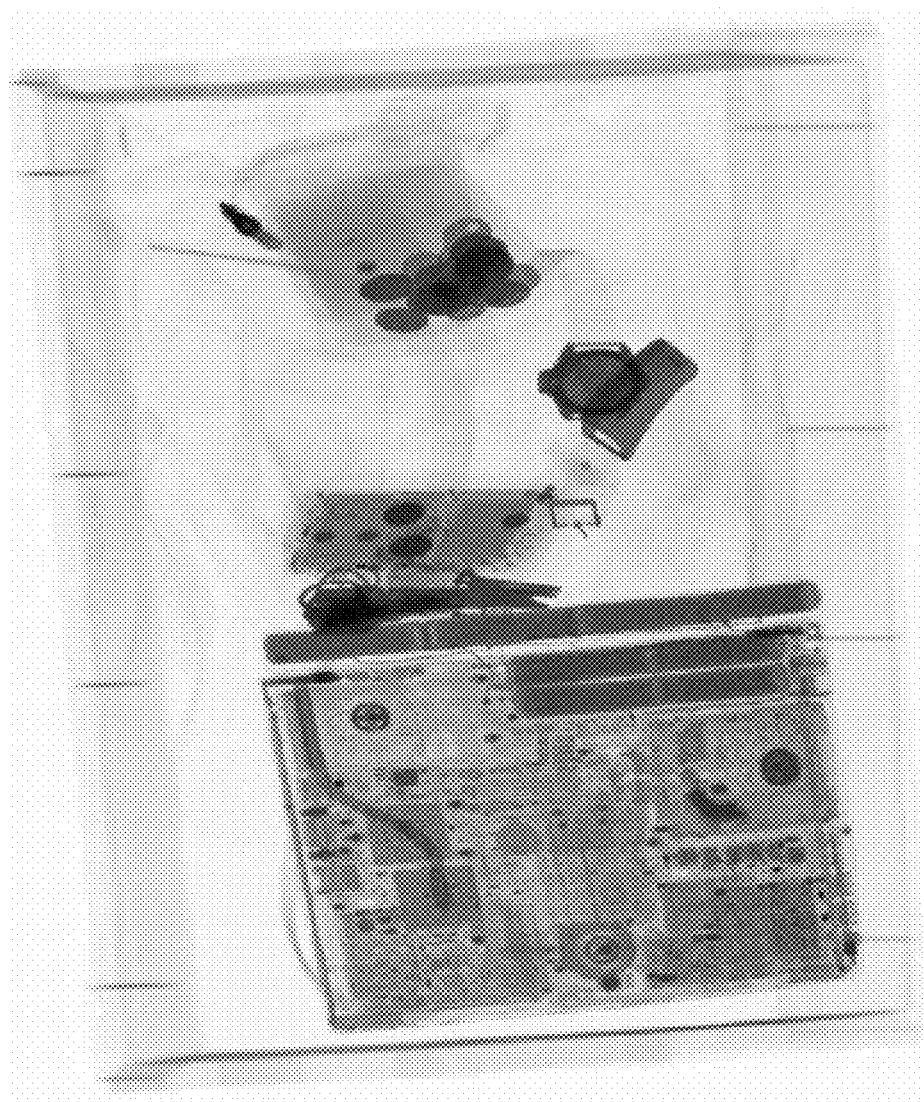
FIG. 5A shows DEXI of a laptop and adjacent articles in a security screening bin.
Figure 5B:
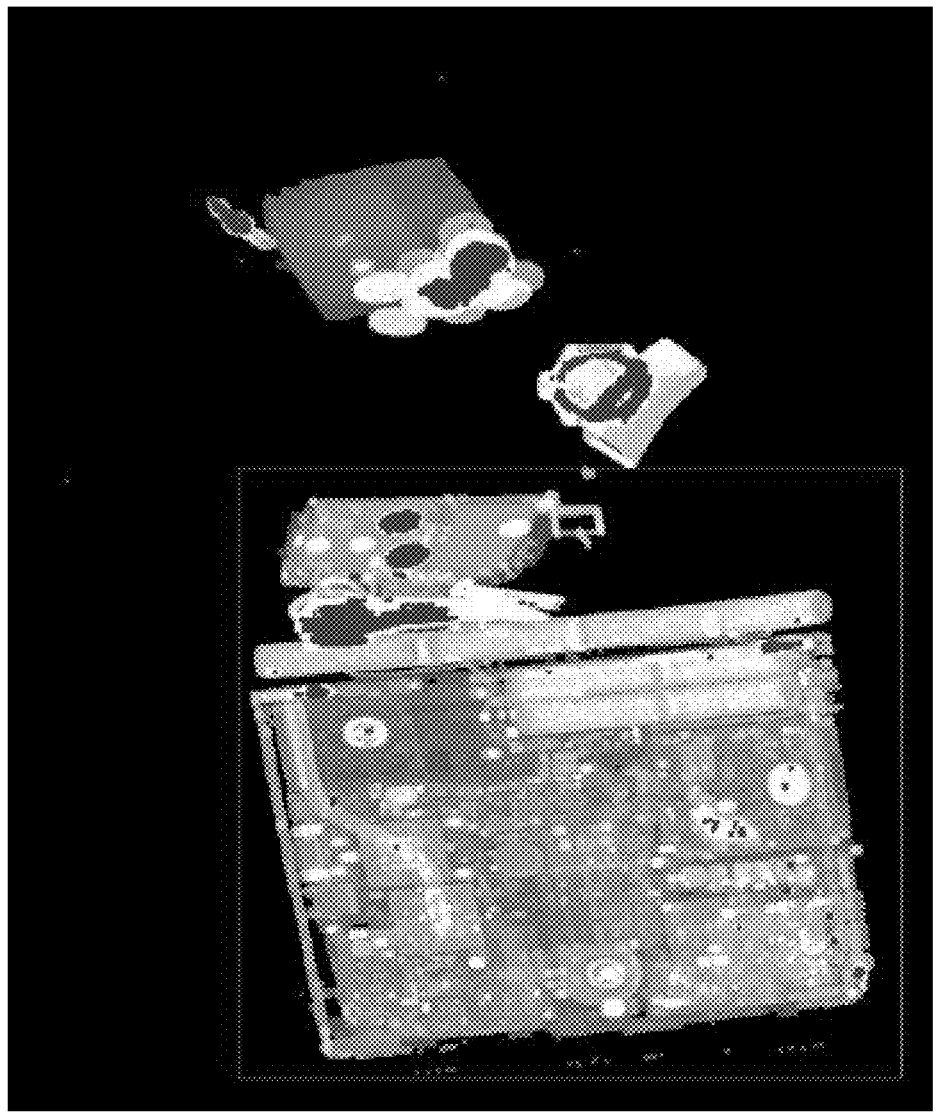
FIG. 5B shows minimum bounding rectangle encompassing the laptop and immediately adjacent articles, but not non-adjacent articles.
Figure 6A:
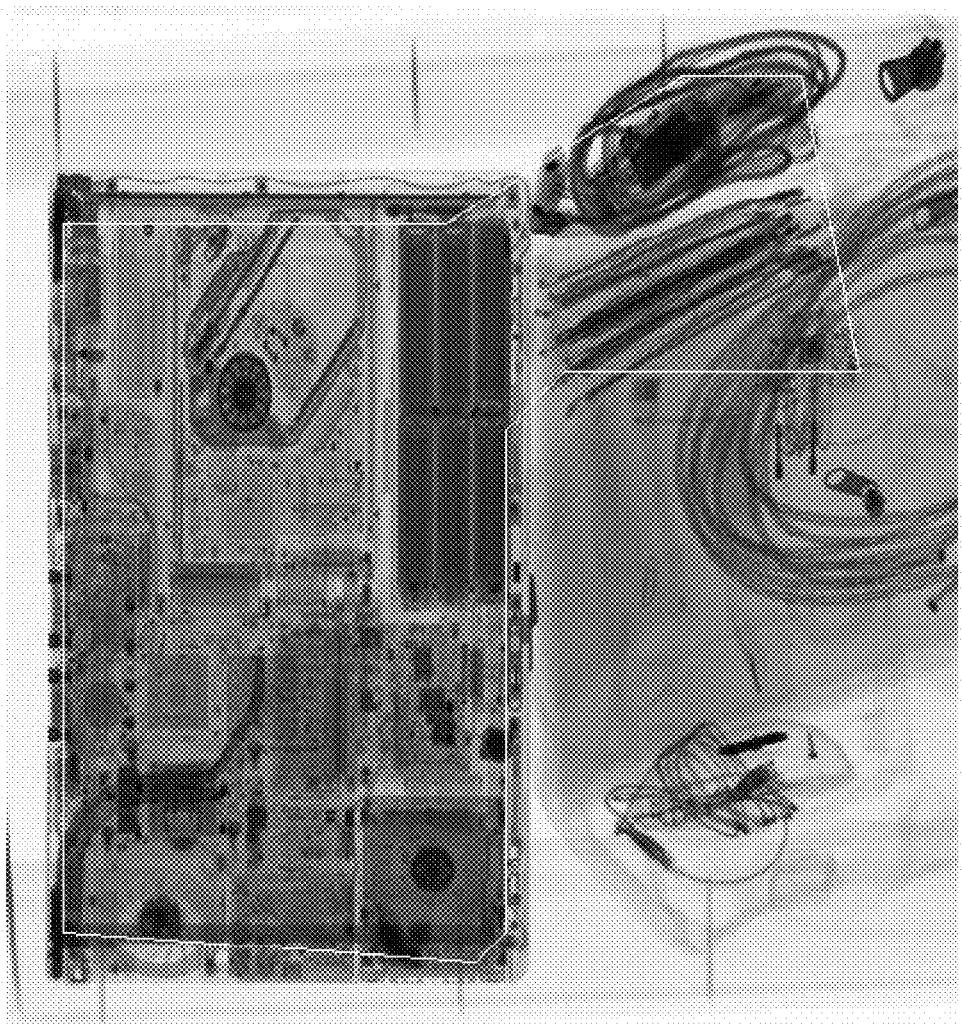
FIG. 6A shows polygon circumscribing a laptop as well as neighboring items that meet a probability threshold.
Figure 6B:
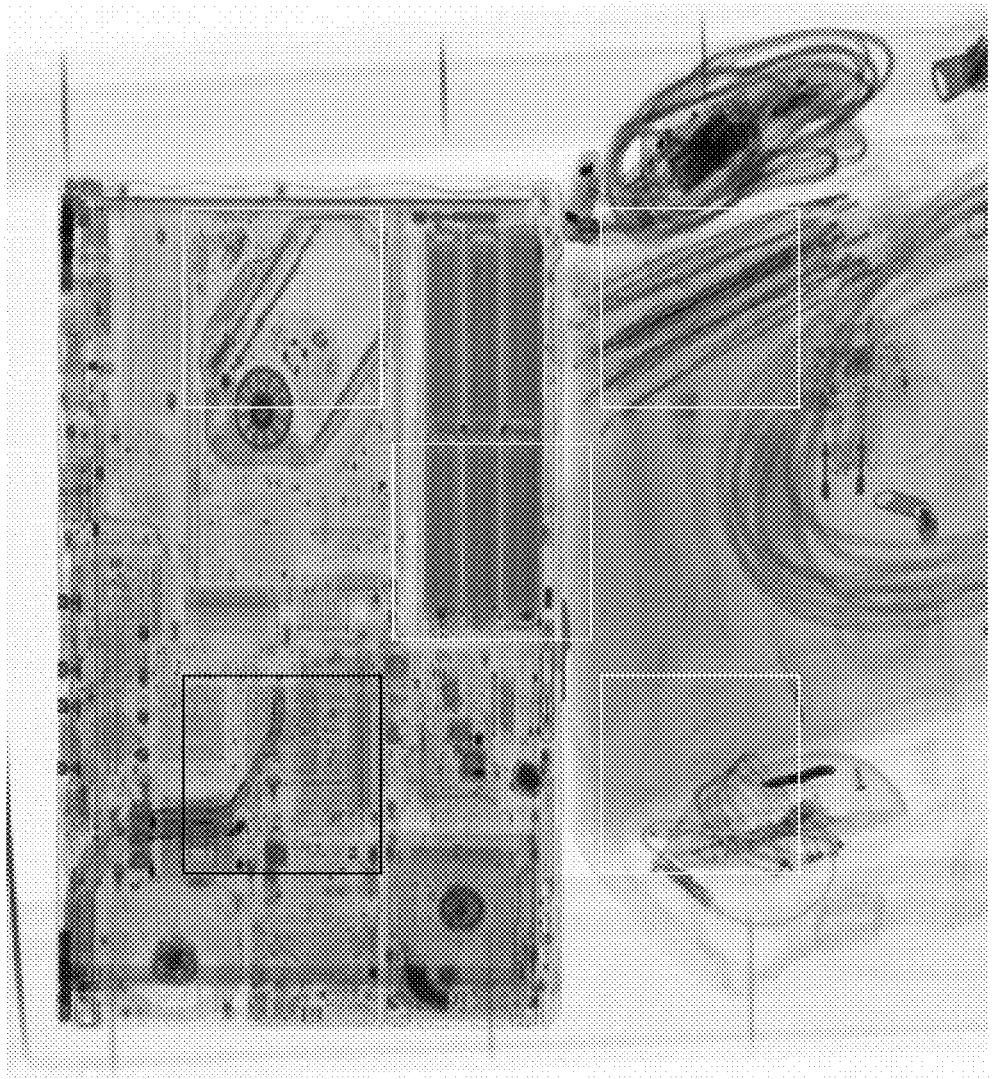
FIG. 6B shows potential search regions within an MBR that encompasses the polygon from FIG. 6A (the highest scoring potential search region is indicated in black).

Because the polygon enclosing the laptop would also have enclosed neighboring objects with similar characteristics (SEE FIG. 6A), the properties of the entire MBR would not meet a threshold designed to determine conclusively that a laptop is present. In order to account for the possibility of objects with similar characteristics to a laptop (e.g., other electronics, metal objects, cords, etc.) located adjacent to a laptop with the MBR (SEE FIG. 5), a portion of the MBR as initially assessed for a likelihood that a laptop is present, rather that assessing the entire MBR at once. Instead, subregions of the MBR are applied to the image and a laptop probability score, based on the analyzed properties above, is calculated for each subregion (SEE FIG. 6B). The subregion with the highest laptop probability score is selected as the initial search region.

Figure 7:
FIG. 7 shows sequential orthogonal growth of the initial search region, extending to the boarders of the MBR and/or the edge of the laptop.

To broaden the search to a greater area of the MBR, the initial search region is expanded in one direction, and a laptop probability score is calculated for the expanded search region and/or the expanded portion. If the score is above a threshold value, the expanded search region is accepted. If the score fails to meet the threshold for acceptance, the expanded portion is rejected. Following acceptance or rejection of the expansion, the search region is then expanded in a direction orthogonal (e.g., 90° clockwise rotation) to the previous expansion. The laptop probability of the newly expanded region is calculated, subjected to the acceptance threshold, and accepted or rejected. This process is repeated, allowing the search region to grow until expansion in each direction (e.g. X°, X+0°, X+180°, X+270°) consecutively results in either the edges of the MBR are exceeded or the perimeter of the area meeting the acceptance threshold is reached (SEE FIG. 7). If a laptop is present within the image, and therefore the MBR, the expanded search region will encompass the laptop area. To ensure that the laptop is fully encompassed by the search region, the search region is slightly enlarged in each dimension. The probability score and size of the final search region are then used to determine the presence of a laptop with the plastic bin being screened.

Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

We claim:

1. A method of detecting the presence of an object of interest in a container, the object of interest comprising more than 50 distinct regions, each distinct region independently being of homogeneous material and density, the method comprising:
    (a) generating, with an imaging system, an image of the container, the image comprising pixels;
    (b) analyzing the image on a central processing unit (CPU) of the imaging system, the analyzing comprising:
        (i) analyzing each pixel of the image for characteristic features of the object of interest;
        (ii) combining the characteristic features into a combined-features probability score for each pixel of the image, wherein the combined-features probability score is proportional to the probability that a pixel contains a portion of the object of interest;
        (iii) selecting a search region comprising contiguous pixels above a threshold combined-features probability score;

(iv) calculating an object-of-interest probability score for the search region, wherein the object-of-interest probability score indicates the likelihood that the search region contains the object of interest;

(v) expanding the search region to produce a search region including an expanded portion;

(vi) calculating an object-of-interest probability score of the expanded portion or the search region comprising the expanded portion;

(vii) accepting or rejecting the expanded portion into the search region based on the object-of-interest probability score of the expanded portion or the search region comprising the expanded portion;

(viii) repeating steps (iv) through (vii) until a final search region is achieved; and (ix) detecting the presence of the object of interest based on the object-of-interest probability score of the final search region.

2. The method according to claim 1, wherein said object-of-interest probability score provides a likelihood that a portion of the object of interest resides within the search region, and wherein the object-of-interest probability score is based upon properties of the object of interest.

3. The method of claim 1, wherein the image is obtained by dual-energy x-ray imaging.

4. The method of claim 1, wherein the object of interest comprises a laptop computer.

5. The method of claim 1, wherein the container comprises luggage, a bag, or a box.

6. The method of claim 1, wherein the CPU is remote from the location of the container and the image is sent to the CPU over a network.

7. The method of claim 1, wherein the characteristic features of the object of interest comprise multiple features selected from the group consisting of: metal %, non-metal %, presence of specific materials, density, number of homogeneous segments, size of homogeneous segments, and shape of homogeneous segments.

8. A method of detecting the presence of an object of interest in a container, the object of interest comprising more than 50 distinct regions, each distinct region independently being of homogeneous material and density, the method comprising:

(a) generating, with an imaging system, an image of the container, the image comprising pixels;

(b) analyzing the image using a central processing unit (CPU) of the imaging system, the analyzing comprising:

(i) analyzing each pixel of the image for characteristic features of the object of interest;

(ii) combining the characteristic features into a combined-features probability score for each pixel of the image, wherein the combined-features probability score is proportional to the probability that a pixel contains a portion of the object of interest;

(iii) applying a minimum bounding region to the image, wherein the minimum bounding region encompasses contiguous pixels above a threshold combined-features probability score;

(iv) selecting a search region within the minimum bounding region comprising a rectangle encompassing the entire minimum bounding region;

(v) calculating an object-of-interest probability score, wherein the object-of-interest probability score provides a likelihood that a portion of the object of interest resides within the search region, and wherein the object-of-interest probability score is based upon properties of the object of interest;

(vi) expanding the search region in one direction;

(vii) calculating an object-of-interest probability score for the expanded portion of the search region or the search region comprising the expanded portion;

(viii) accepting or rejecting the expanded portion into the search region based on the object-of-interest probability score of the expanded portion or the search region comprising the expanded portion;

(ix) repeating steps (v) through (viii) until a final search region is achieved (x) determining whether the object of interest exist within the container based on the final size and/or final probability score of the final search region.

9. The method of claim 8, the image is obtained by dual-energy x-ray imaging.

10. The method of claim 8, wherein the object of interest comprises a laptop computer.

11. The method of claim 8, wherein the container comprises luggage, a bag, or a box.

12. The method of claim 8, wherein the CPU is remote from the location of the container and the image is sent to the CPU over a network.

13. The method of claim 8, wherein the characteristic features of the object of interest comprise multiple features selected from the group consisting of: metal %, non-metal %, presence of specific materials, density, number of homogeneous segments, size of homogeneous segments, and shape of homogeneous segments.

* * * * *